United States Patent
Sensui

(10) Patent No.: US 6,188,845 B1
(45) Date of Patent: Feb. 13, 2001

(54) MULTIPOINT FOCUS DETECTING APPARATUS

(75) Inventor: Takayuki Sensui, Tokyo (JP)

(73) Assignee: Asahi Kogaku Kogyo Kabushiki Kaisha, Tokyo (JP)

( * ) Notice: Under 35 U.S.C. 154(b), the term of this patent shall be extended for 0 days.

(21) Appl. No.: 09/404,532

(22) Filed: Sep. 24, 1999

(30) Foreign Application Priority Data

Sep. 25, 1998 (JP) .................................................. 10-272321

(51) Int. Cl.$^7$ .................................................. G03B 13/36
(52) U.S. Cl. .......................................... 396/114; 396/121
(58) Field of Search ..................................... 396/114, 111, 396/121, 122, 123; 250/208.8, 201.6, 201.2

(56) References Cited

U.S. PATENT DOCUMENTS

| | | | |
|---|---|---|---|
| 5,397,887 | 3/1995 | Sensui | 250/201.8 |
| 5,530,236 | 6/1996 | Sensui | 250/201.8 |
| 5,646,393 * | 7/1997 | Sensui | 250/201.8 |
| 5,740,477 | 4/1998 | Kosako et al. | 396/101 |

* cited by examiner

Primary Examiner—W. B. Perkey
(74) Attorney, Agent, or Firm—Greenblum & Bernstein, P.L.C.

(57) ABSTRACT

A multipoint focus detecting apparatus having a plurality of focus detecting zones arranged in a first pattern on a predetermined focal plane, and a corresponding plurality of arrays of light receiving elements which are arranged in a second pattern, wherein a corresponding plurality of light bundles which are passed through the plurality of focus detecting zones are made incident on the plurality of arrays of light receiving elements. The multipdint focus detecting apparatus includes: a plurality of pairs of separator lenses, each pair of which divides an image in a corresponding one of the plurality of focus detecting zones into two separate images; a separator mask positioned in front of the plurality of pairs of separator lenses and including a plurality of pairs of openings to correspond to the plurality of pairs of separator lenses; and a light bundle deflector positioned in the closevicinity of the plurality of pairs of separator lenses. A first array of the plurality of arrays of light receiving elements and a second array of the plurality of arrays of light receiving elements are aligned so as to be parallel to each other and apart from each other by a predetermined distance. The light bundle deflector is positioned in the vicinity of the plurality of pairs of separator lenses so that a principal ray of the first light bundle and a principal ray of the second light bundle extend parallel to each other.

13 Claims, 4 Drawing Sheets

MULTIPOINT FOCUS DETECTING APPARATUS

BACKGROUND OF THE INVENTION

1. Field of the Invention

The present invention relates to a multipoint focus detecting apparatus for an optical instrument such as an SLR camera.

2. Description of the Prior Art

In recent years, SLR cameras provided with a multipoint focus detecting unit for determining a focus state (defocus) at each of a plurality of focus detection zones (focusing points) have been developed. In the optical system of a conventional multipoint focus detecting unit, other than the central focus detection zone arranged over the optical axis, one or more off-center focus detection zones are arranged away from the optical axis, and bundle of rays which form an object image which are passed through the central and off-center focus detection zones are respectively deflected by corresponding mirrors to be incident on corresponding light receiving elements arranged in a horizontal line. For instance, a light bundle of an object image which is passed through the horizontally-elongated central focus detection zone is deflected once by a mirror to be focused on a corresponding horizontally-elongated array of light receiving elements. At this time, the image observed through the horizontally-elongated central focus detection zone is divided into two, by a corresponding pair of separator lenses, to be formed as two separate images on the corresponding horizontally-elongated array of light receiving elements. At the same time, another light bundle of the object image which is passed through a vertically-elongated off-center focus detection zone is deflected twice by two mirrors to be focused on a corresponding horizontally-elongated array of light receiving elements. The image observed through the vertically-elongated off-center focus detection zone is divided into two by a corresponding pair of separator lenses to be formed as two separate images on the corresponding horizontally-elongated array of light receiving elements. The central and off-center pairs of separator lenses are arranged away from the central and off-center light receiving elements by a predetermined distance.

In the optical system of such a conventional multipoint focus detecting unit, the principal rays which have respectively passed through the corresponding pairs of separator lenses to proceed towards the corresponding arrays of light receiving elements, are not parallel to one another. Accordingly, once a mechanical dimensional error occurs and/or the arrays of light receiving elements deviate from the original positions along the optical axis direction thereof, the light bundles which are respectively passed through the corresponding pairs of separator lenses cannot be precisely led to the corresponding arrays of light receiving elements, which makes it difficult to adjust the position of each light bundle relative to the corresponding arrays of light receiving elements. Since the principal rays of the light bundles which are respectively passed through the corresponding pairs of separator lenses are not parallel to one another, the respective spaces among the principal rays vary if the arrays of light receiving elements deviate forwardly or rearwardly. This requires the position of each array of light receiving elements to be adjusted in the forward/reward direction thereof.

SUMMARY OF THE INVENTION

The primary object of the present invention is to provide a multipoint focus detecting apparatus having a structure with which a mechanical dimensional error, and/or an error due to an imprecise assembly, does not easily occur and which makes it possible to easily adjust the position of each array of light receiving elements relative to the incident light bundle thereon even if such errors occur.

To achieve the object mentioned above, according to an aspect of the present invention, there is provided a multipoint focus detecting apparatus having a plurality of focus detecting zones arranged in a first pattern on a predetermined focal plane, and a corresponding plurality of arrays of light receiving elements which are arranged in a second pattern that is different from the first pattern, wherein a corresponding plurality of light bundles which are passed through the plurality of focus detecting zones are made incident on the plurality of arrays of light receiving elements, respectively. The multipoint focus detecting apparatus includes: a plurality of pairs of separator lenses, each pair of which divides an image in a corresponding one of the plurality of focus detecting zones into two separate images on a corresponding one of the plurality of arrays of light receiving elements; a separator mask positioned in front of the plurality of pairs of separator lenses and including a plurality of pairs of openings to correspond to the plurality of pairs of separator lenses, each opening of the plurality of pairs of openings determining the size of a bundle of rays which enters a corresponding one separator lens of the plurality of pairs of separator lenses; and a light bundle deflector positioned in the close vicinity of the plurality of pairs of separator lenses. A first array of the plurality of arrays of light receiving elements, on which a first light bundle which is passed through a first focus detecting zone of the plurality of focus detecting zones is incident, and a second array of the plurality of arrays of light receiving elements, on which a second light bundle which is passed through a second focus detecting zone of the plurality of focus detecting zones is incident, are aligned so as to be parallel to each other and apart from each other by a predetermined distance in a direction perpendicular to a direction in which light receiving elements of each of the plurality of arrays of light receiving elements are aligned; and wherein the light bundle deflector is positioned in the vicinity of the plurality of pairs of separator lenses so that a principal ray of the first light bundle and a principal ray of the second light bundle extend parallel to each other in a plane perpendicular to the direction in which the light receiving elements are aligned.

Preferably, the light bundle deflector includes a plurality of auxiliary lenses each of which is positioned in front of a corresponding opening of the plurality of pairs of openings so that the optical axis of each the auxiliary lens is decentered from a center axis of the corresponding opening.

Preferably, the light bundle deflector includes a plurality of prisms positioned in front of the plurality of pairs of openings, respectively.

Preferably, each separator lens of the plurality of pairs of separator lenses is decentered from a center axis of a corresponding opening of the plurality of pairs of openings.

According to another aspect of the present invention there is provided a multipoint focus detecting apparatus having a plurality of focus detecting zones arranged in a first pattern on a predetermined focal plane, and a corresponding plurality of arrays of light receiving elements which are arranged in a second pattern that is different from the first pattern, wherein a corresponding plurality of light bundles which are passed through the plurality of focus detecting zones are made incident on the plurality of arrays of light receiving elements, respectively. The multipoint focus detecting apparatus includes: a plurality of pairs of separator lenses, each pair of which divides a light bundle of an image observed through a corresponding one of the plurality of focus detecting zones into two light bundles, so that the light bundle is formed as two separate images on a corresponding one of the plurality of arrays of light receiving elements; and a separator mask positioned in front of the plurality of pairs of separator lenses and including a plurality of pairs of openings to correspond to the plurality of pairs of separator lenses, each opening of the plurality of pairs of openings determining the size of a bundle of rays which enters a corresponding one separator lens of the plurality of pairs of separator lenses. A first array of the plurality of arrays of light receiving elements, on which a first light bundle which is passed through a first focus detecting zone of the plurality of focus detecting zones is incident, and a second array of the plurality of arrays of light receiving elements, on which a second light bundle which is passed through a second focus detecting zone of the plurality of focus detecting zones is incident, are positioned parallel to each other and apart from each other by a predetermined distance in a direction perpendicular to a direction in which light receiving elements of each of the plurality of arrays of light receiving elements are aligned; and wherein each separator lens of the plurality of pairs of separator lenses is decentered from a center axis of a corresponding opening of the plurality of pairs of openings so that a principal ray of the first light bundle and a principal ray of the second light bundle extend parallel to each other in a plane perpendicular to the direction in which the light receiving elements are aligned.

Preferably, the first focus detecting zone and the second focus detecting zone are positioned on the predetermined focal plane away from the center of the predetermined focal plane on the same side relative to the center of the predetermined focal plane; wherein the second focus detecting zone is positioned farther away from the center of the predetermined focal plane than the first focus detecting zone.

Preferably, the first focus detecting zone is positioned on the predetermined focal plane at substantially the center thereof, and wherein the second focus detecting zone is positioned away from the center of the predetermined focal plane.

Preferably, each light receiving element of the plurality of arrays of light receiving elements includes a photodiode.

Preferably, the multipoint focus detecting apparatus is incorporated in an SLR camera.

The present disclosure relates to subject matter contained in Japanese Patent Application No. 10-272321 (filed on Sep. 25, 1998) which is expressly incorporated herein by reference in its entirety.

BRIEF DESCRIPTION OF THE DRAWINGS

The present invention will be described below in detail with reference to the accompanying drawings, in which.

DESCRIPTION OF THE PREFERRED EMBODIMENT

Figure 7:
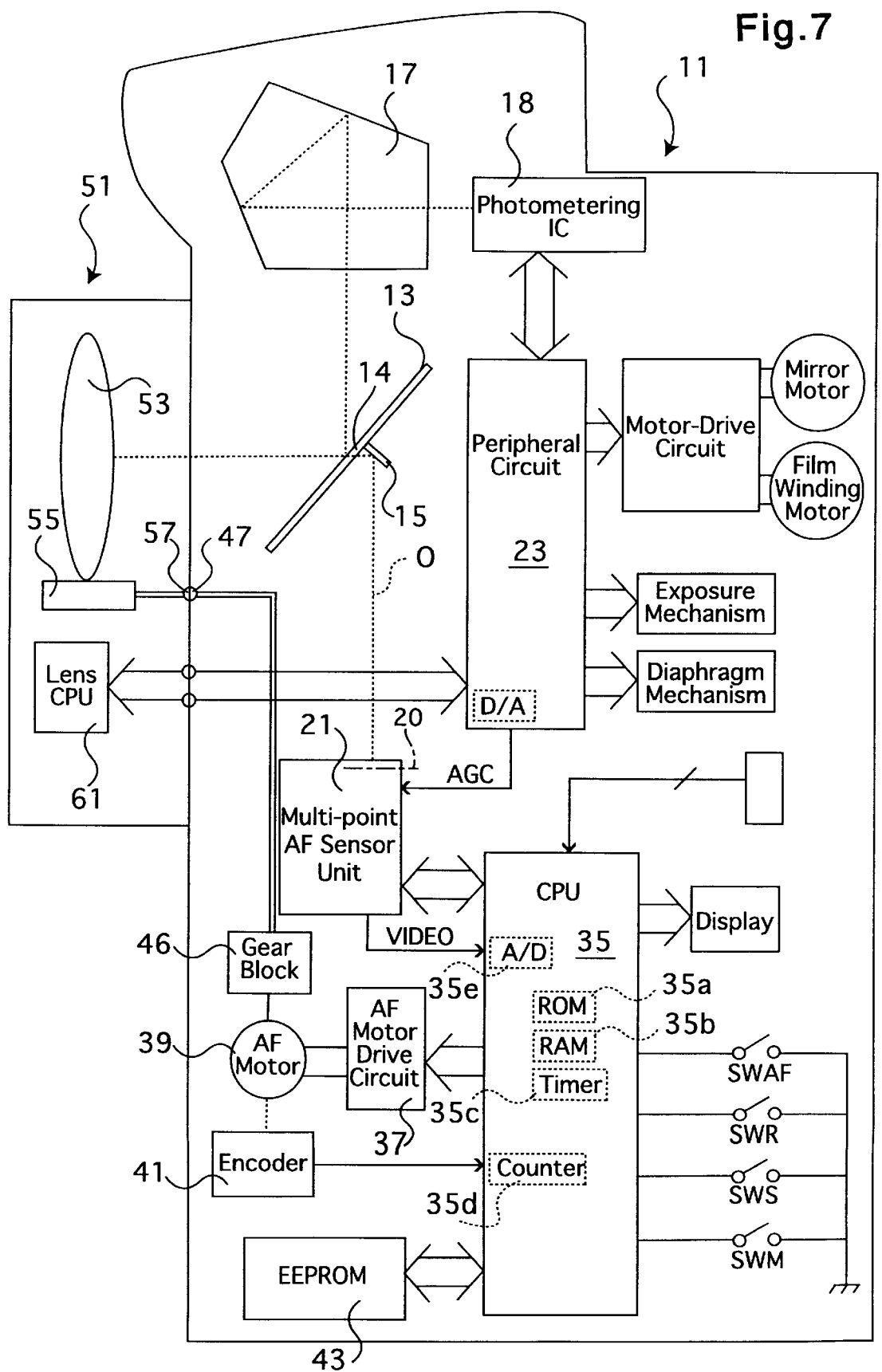
FIG. 7 is a block diagram of fundamental components of a single lens reflex camera provided with the multipoint focus detecting apparatus according to the present invention.

FIG. 7 shows a block diagram of fundamental elements of an SLR (single-lens-reflex) camera system provided with a multipoint focus detecting apparatus to which the present invention is applied. The autofocus SLR camera system includes a camera body 11 and an interchangeable photographing lens 51 detachably attached to the camera body 11. The camera body 11 is provided with a multipoint focus detecting apparatus and an autofocusing device (multipoint autofocusing system).

A major part of object light (light which is to form an object image to be photographed) entering the camera body 11 through the photographing lens 51 is reflected by a main mirror (quick-return mirror) 13 toward a pentagonal prism 17, which is a fundamental element of a finder optical system in the camera body 11. Subsequently, the object light is reflected more than once by the pentagonal prism 17 and exits out of an eyepiece (not shown). Part of the light reflected by the pentagonal prism 17 enters a light receiving element of a photometering IC 18. Part of the object light which is incident on the main mirror 13 passes through a half mirror portion 14 provided on the main mirror 13 to be reflected downwardly by an auxiliary mirror 15 provided at the rear of the main mirror 13. The light reflected downwardly by the auxiliary mirror 15 enters a multipoint AF sensor unit 21 provided as a multipoint focus detecting apparatus. The multipoint AF sensor unit 21 can be, for example, a phase-difference distance measuring sensor. In this particular embodiment, the multipoint AF sensor unit 21 is in the form of a phase-difference distance measuring sensor which includes six CCD line sensors (212A through 212F shown in FIG. 1) corresponding to six focus detection zones (70A through 70F shown in FIG. 2).

The camera body 11 is provided with a main CPU 35 which manages the overall operations of the camera body 11. The multipoint AF sensor unit 21, a peripheral circuit 23 to which the photometering IC 18 is connected, an AF motor drive circuit 37 for driving an AF motor 39, an encoder 41, and an EEPROM 43 are provided within the camera body 11 and are all connected to the CPU 35.

The main CPU 35 calculates a defocus amount for each of the six line sensors 212A through 212F in accordance with a predetermined operation, using integral data of each of the six line sensors 212A through 212F that are input from the multipoint AF sensor unit 21. Subsequently, the main CPU 35 determines the defocus amount to be used, and the priority thereof, in accordance with all the calculated defocus amounts to determine and calculate the rotational direction and the number of revolutions of the AF motor 39 (i.e., the number of pulses to be output from the encoder 41), respectively. Thereafter, the main CPU 35 drives the AF motor 39 through the AF motor drive circuit 37 in accordance with the determined rotational direction and the calculated number of revolutions. The main CPU 35 detects and counts the pulses output from the encoder 41 in association with the rotation of the AF motor 39. When the counted number of pulses reaches the calculated number of pulses, the CPU 35 sends a signal to the AF motor drive circuit 37 to stop the AF motor 39.

Rotation of the AF motor 39 is transmitted to the photographing lens 51 through a gear block 46 and a connection between a joint 47 provided on a mount of the camera body 11 and another joint 57 provided on a corresponding mount of the photographing lens 51. The photographing lens 51 is provided therein with a lens drive mechanism 55 for transmitting the rotation of the joint 57 to an AF lens group 53, so that the AF lens group 53 is moved by the AF motor 39 via the gear block 46, the joints 47, 57 and the lens drive mechanism 55.

The main CPU 35 is provided therein with a ROM 35a in which predetermined programs are stored, a RAM 35b in which data for the calculating operation and control operation is temporarily stored, a counting reference timer 35c, a counter 35d, and an A/D converter 35e. The EEPROM 43 serving as an external memory is connected to the main CPU 35. The EEPROM 43 stores therein various inherent constants of the camera body 11 and predetermined values necessary for integration control.

A photometering switch SWS which is turned ON when a release button is depressed by a half step, and a release switch SWR which is turned ON when the release button is fully depressed, are connected to the main CPU 35. ON/OFF data of each of the photometering switch SWS and the release switch SWR is input to the main CPU 35.

The main CPU 35 functions as a controller for comprehensively controlling the operations of the camera body 11 and also the electronic components of the photographing lens 51. The main CPU 35 constitutes an integration controller together with the multipoint AF sensor unit and the peripheral control circuit 23, and also constitutes a lens driver together with the AF motor 39.

The photographing lens 51 is provided therein with the lens drive mechanism 55 for moving the AF lens group 53 along the optical axis, the joint 57 which can be connected to the joint 47 of the camera body 11 to transmit the rotation of the AF motor 39 to the lens drive mechanism 55, and a lens CPU 61 which exchanges necessary data with the main CPU when the photographic lens 51 is connected to the camera body 11.

Figure 1:
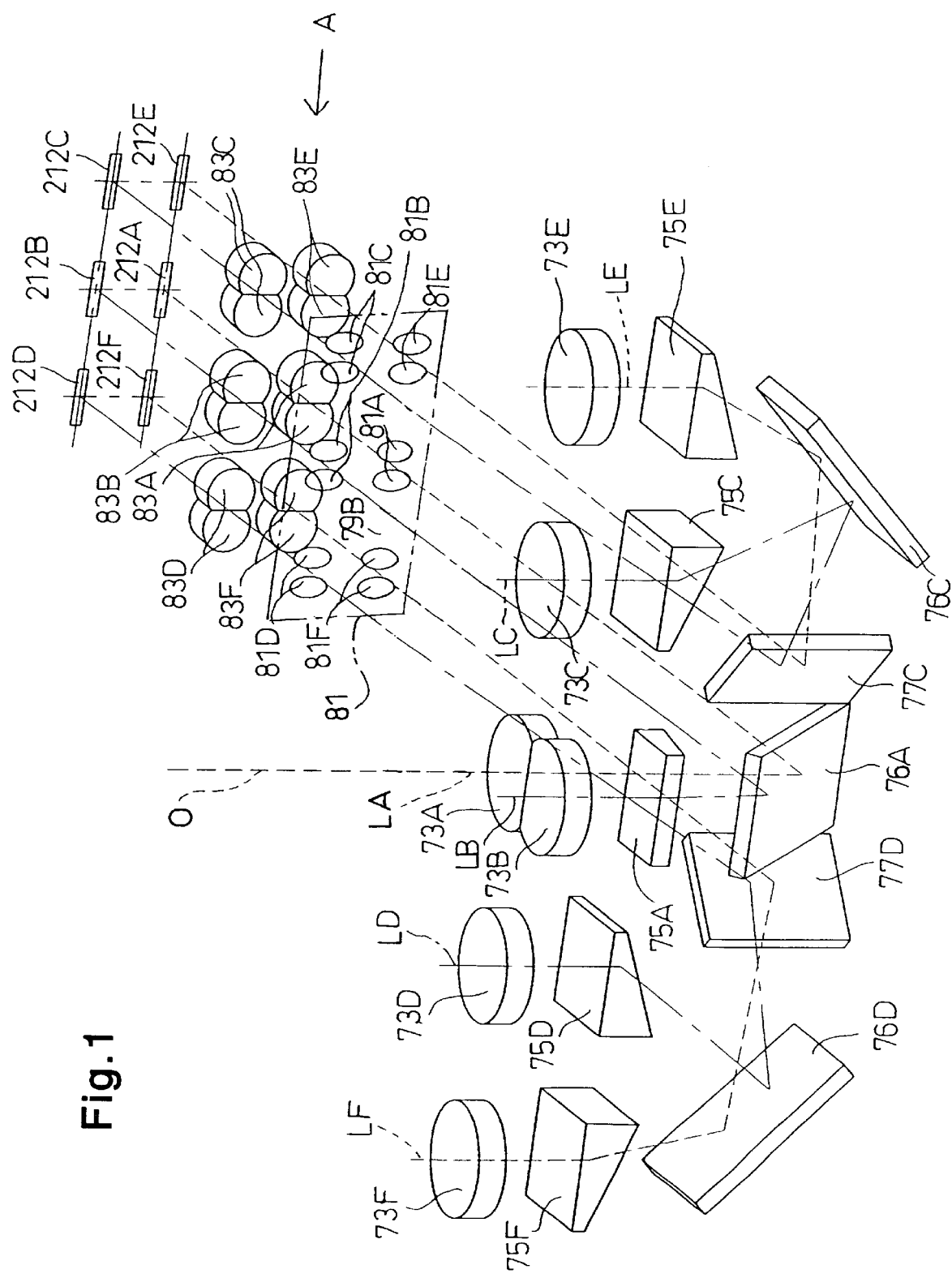
FIG. 1 is a schematic perspective view of an embodiment of an optical system of a multipoint focus detecting apparatus according to the present invention.
Figure 2:
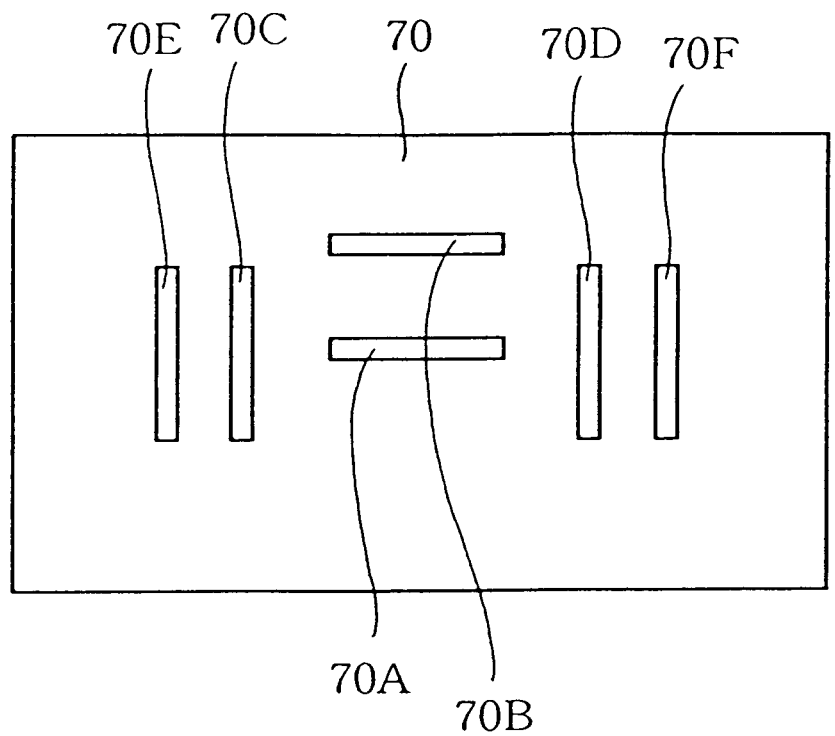
FIG. 2 is a plan view of photographic plane on which a plurality of focus detection zones are arranged in the camera provided with the multipoint focus detecting apparatus, showing the arranging pattern of the plurality of focus detection zones.

FIG. 1 shows an embodiment of fundamental elements of the multipoint AF sensor unit 21, and FIG. 2 shows an embodiment of an arrangement pattern of the six focus detection zones. In this embodiment the six focus detection zones 70A, 70B, 70C, 70D, 70E and 70F are arranged across an image plane 70, i.e., the predetermined focal plane 20. The multipoint AF sensor unit 21 is provided with six CCD line sensors 212A, 212B, 212C, 212D, 212E and 212F corresponding to the six focus detection zones 70A, 70B, 70C, 70D, 70E and 70F, respectively.

The central focus detection zone 70A is a horizontally-elongated zone positioned substantially central to the image plane 70. The upper-central focus detection zone 70B is a horizontally-elongated zone positioned above the central focus detection zone 70A. The central focus detection zone 70A and the upper-central focus detection zone 70B are substantially parallel to each other.

The left focus detection zone 70C and the right focus detection zone 70D are vertically-elongated zones, and are positioned on respective sides of the central and upper-central focus detection zones 70A and 70B. The leftmost focus detection zone 70E is a vertically-elongated zone, and is positioned on the left side of the left focus detection zone 70C as viewed in FIG. 2. The rightmost focus detection zone 70F is also a vertically-elongated zone, and is positioned on the right side of the right focus detection zone 70D as viewed in FIG. 2. The vertically-elongated focus detection zones 70C, 70D, 70E and 70F are substantially parallel to each other.

The arrangement pattern of the six line sensors 212A through 212F is different from the arrangement pattern of the six focus detection zones 70A, 70B, 70C, 70D, 70E and 70F (see FIGS. 1 and 2 [the line sensors 212A through 212F are also different from the arrangement pattern of the slots 72A through 72F of the cover 72]). The six line sensors 212A through 212F are arranged as shown in FIG. 1 so that three line sensors (212A, 212E and 212F) are arranged at regular intervals along a lower line while the remaining three line sensors (212B, 212C and 212D) are arranged at the same regular intervals along an upper line positioned above and parallel to the lower line. All the six line sensors 212A through 212F are composed on a common circuit board (212 shown in FIGS. 4 through 6), so that the light receiving surfaces of the six line sensors 212A through 212F are positioned on a common plane.

Figure 3:
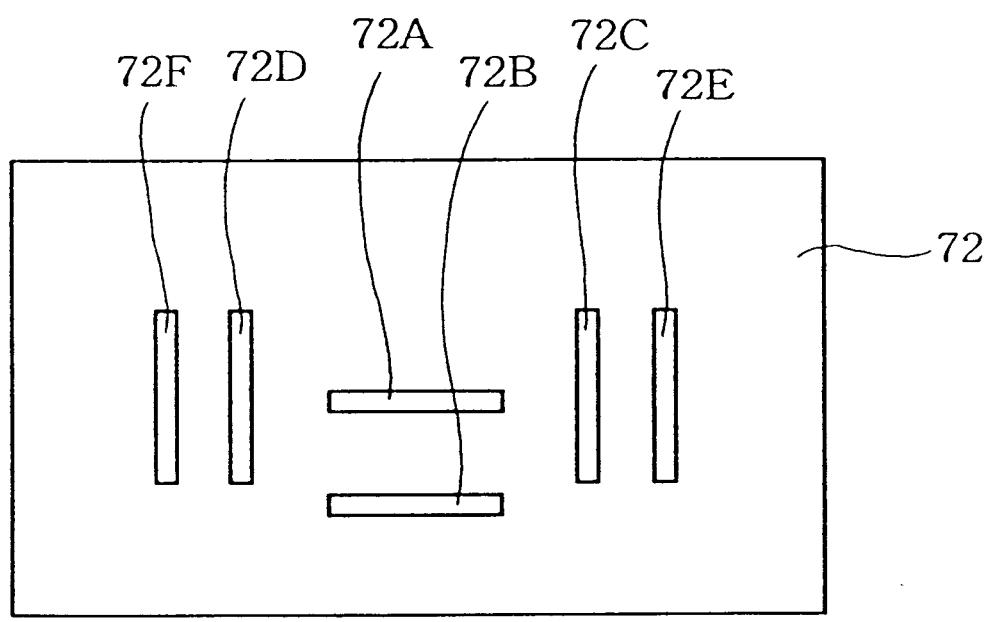
FIG. 3 is a plan view of a cover provided thereon with a plurality of slots corresponding to the plurality of focus detection zones shown in FIG. 2 (the orientation of the slots is reversed in the vertical direction with respect to the photographic plane of FIG. 2)

The multifocus AF sensor unit 21 is provided with an opaque cover (focus detection zone determining plate) 72 on or in the vicinity of a predetermined focal plane (located at a position equivalent with a film surface) on which a primary image of an object which is to be photographed is formed by the photographing lens 51. The cover 72 is provided with six rectangular slots 72A, 72B, 72C, 72D, 72E and 72F for extracting six object images corresponding to the six focus detection zones 70A through 70F. FIG. 3 shows a plan view of the cover 72 as viewed from above the camera body 11 (viewed in a vertical direction in FIG. 1).

The slots 72A through 72F are shaped and arranged to correspond to the focus detection zones 70A through 70F, respectively, so that each of the slots 72A through 72F determines the corresponding focus detection zones 70A, 70B, 70C, 70D, 70E or 70F. Namely, the six light bundles which are passed through the slots 72A through 72F are made incident on the six line sensors 212A through 212F to form the object images corresponding to the six focus detection zones 70A through 70F on the six line sensors 212A through 212F, respectively, which makes it possible to detect a focus state (defocus amount) for each of the six focus detection zones 70A through 70F. In other words, the image seen through each of the six focus detection zones 70A through 70F is divided into two images by a corresponding pair of separator lenses 83A, 83B, 83C, 83D, 83E or 83F to be formed as two separate images on the corresponding line sensor 212A, 212B, 212C, 212D, 212E or 212F. A separator mask 81 is positioned in front of the six pairs of separator lenses 83A, 83B, 83C, 83D, 83E and 83F. The separator mask 81 is provided thereon with six pairs of openings 81A, 81B, 81C, 81D, 81E and 81F.

Note that the light bundles shown in FIG. 1 which pass through the centers of the detection zones 70A, 70B, 70C, 70D, 70E or 70F represent the principal rays thereof. One side from which a light bundle comes toward an optical element is herein termed "the front of the member", while another side toward which a light bundle goes away from the optical member is herein termed "behind the member".

Each of the line sensors 212A through 212F includes an array of photodiodes (array of light receiving elements). Each photodiode accumulates (integrates) an electric charge in accordance with the brightness of the object image formed on the photodiode. The accumulated electric charges are read out of the photodiodes by a conventional drive circuit and is converted into a video signal by a signal processing circuit. This video signal is input to the CPU 35. The CPU 35 determines the distance (phase difference) between a pair of object images formed on each of the line sensors 212A through 212F, using an algorithm according to a phase difference detecting method known in the art. Subsequently, the CPU 35 calculates a defocus amount using the determined distance (phase difference) to determine and calculate the rotational direction and the number of revolutions of the AF motor 39 (i.e., the number of pulses to be output from an encoder 41) necessary for moving the AF lens group 53 to an in-focus position thereof. Note that the number of pulses to be output from the encoder 41 is calculated using one amount of defocus selected from among the six amounts of defocus obtained for the six line sensors 212A through 212F.

Six condenser lenses 73A, 73B, 73C, 73D, 73E and 73F are positioned behind the cover 72 to correspond to the six slots 72A, 72B, 72C, 72D, 72E and 72F, respectively. Five prisms 75A, 75C, 75D, 75E and 75F for deflecting light paths are positioned behind the six condenser lenses 73A, 73B, 73C, 73D, 73E and 73F. Five mirrors 76A, 76C, 76D, 77C and 77D are positioned behind the five prisms 75A, 75C, 75D, 75E and 75F.

Firstly, the optical systems for the two light bundles which are respectively passed through the central and upper-central slots 72A and 72B will be hereinafter discussed. A central light bundle LA which is passed through the slot 72A and the condenser lens 73A, is deflected by the central mirror 76A by approximately 90 degrees to proceed towards the line sensor 212A. The prism 75A is positioned behind the condenser lens 73B. An upper-central light bundle LB which is passed through the slot 72B and the condenser lenses 73B is deflected by the prism 75A in directions to decrease the distance between the central light bundles LA and LB. Subsequently, the upper-central light bundle LB which is passed through the prism 75A is deflected by the central mirror 76A by approximately 90 degrees to proceed towards the line sensor 212B. In this illustrated embodiment, the primary light ray of the central light bundle LA is coincident with the optical axis O of the photographic lens 51.

Part of the central light bundle LA reflected by the central mirror 76A passes through and is divided into two light bundles by the corresponding pair of openings 81A, and subsequently these two light bundles pass through the pair of separator lenses 83A to be formed as two images on the central line sensor 212A, respectively, with the two images thereon being apart from each other by a space (base length) corresponding to the object distance. Likewise, part of the upper-central light bundle LB reflected by the central mirror 76A passes through and is divided into two light bundles by the corresponding pair of openings 81B, and subsequently these two light bundles pass through the pair of separator lenses 83B to be formed as two images on the upper-central line sensor 212B, respectively, with the two images thereon being apart from each other by a space (base length) corresponding to the object distance.

The central line sensor 212A and the upper-central line sensor 212B are arranged parallel to each other and apart from each other by a predetermined distance in a direction (the vertical direction as viewed in FIG. 1) perpendicular to the direction in which the photodiodes of each line sensor are aligned.

Secondly, the optical systems for the two light bundles which are respectively passed through the slots 72C and 72E will be hereinafter discussed. The prism 75C is positioned behind the condenser lens 73C. A left light bundle LC which is passed through the slot 72C and the condenser lens 73C is deflected by the prism 75C, in a direction away from the central light bundle LA (i.e., in a direction to the right as viewed in FIG. 1), to be incident on the first left mirror 76C. Subsequently, the left light bundle LC is reflected by the first left mirror 76C to be incident on the second left mirror 77C and is reflected thereby to proceed towards the line sensor 212C.

On the other hand, the prism 75E is positioned behind the condenser lens 73E. A leftmost light bundle LE which is passed through the slot 72E and the condenser lens 73E is deflected by the prism 75E, in a direction to approach the left light bundle LC, to be incident on the first left mirror 76C. Subsequently, the leftmost light bundle LE is reflected by the first left mirror 76C to be incident on the second left mirror 77C and is reflected thereby to proceed towards the line sensor 212E.

Part of the left light bundle LC reflected by the second left mirror 77C passes through and is divided into two light bundles by the corresponding pair of openings 81C, and subsequently these two light bundles pass through the pair of separator lenses 83C to be formed as two images on the line sensor 212C, respectively, with the two images thereon being apart from each other by a space (base length) corresponding to the object distance. Likewise, part of the leftmost light bundle LE reflected by the second left mirror 77C passes through and is divided into two light bundles by the corresponding pair of openings 81E, and subsequently these two light bundles pass through the pair of separator lenses 83E to be formed as two images on the line sensor 212E, respectively, with the two images thereon being apart from each other by a space (base length) corresponding to the object distance.

Similar to the line sensors 212A and 212B, the line sensors 212C and 212E are arranged parallel to each other and apart from each other by a predetermined distance in the direction (the vertical direction as viewed in FIG. 1) perpendicular to the direction in which the photodiodes of each line sensor are aligned.

Thirdly, the optical systems for the two light bundles which are respectively passed through the right and rightmost focus detection zones 70D and 70F will be hereinafter discussed. Note that the optical systems for the two light bundles which are respectively passed through the slots 72D and 72F and the optical systems for the two light bundles which are respectively passed through the slots 72C and 72E are arranged symmetrically with respect to a plane including the optical axis O shown in FIG. 1.

The prism 75D is positioned behind the condenser lens 73D. A right light bundle LD which is passed through the slot 72D and the condenser lens 73D is deflected by the prism 75D in a direction away from the central light bundle LA (i.e., in a direction to the left as viewed in FIG. 1) to be incident on the first right mirror 76D. Subsequently, the right light bundle LD is reflected by the first right mirror 76D to be incident on the second right mirror 77D and is reflected thereby to proceed towards the line sensor 212D.

On the other hand, the prism 75F is positioned behind the condenser lens 73F. A rightmost light bundle LF which is passed through the slot 72F and the condenser lens 73F is deflected by the prism 75F in a direction to approach the right light bundle LD to be incident on the first right mirror 76D. Subsequently, the rightmost light bundle LF is reflected by the first right mirror 76D to be incident on the second right mirror 77D and is reflected thereby to proceed towards the line sensor 212F.

Part of the right light bundle LD reflected by the second right mirror 77D passes through and is divided into two light bundles by the corresponding pair of openings 81D, and subsequently these two light bundles pass through the pair of separator lenses 83D to be formed as two images on the line sensor 212D, respectively, with the two images thereon being apart from each other by a space (base length) corresponding to the object distance. Likewise, part of the rightmost light bundle LF reflected by the second right mirror 77D passes through and is divided into two light bundles by the corresponding pair of openings 81F, and subsequently these two light bundles pass through the pair of separator lenses 83F to be formed as two images on the line sensor 212F, respectively, with the two images thereon being apart from each other by a space (base length) corresponding to the object distance.

Similar to the line sensors 212A and 212B, the line sensors 212D and 212F are arranged parallel to each other and apart from each other by a predetermined distance in the direction (the vertical direction as viewed in FIG. 1) perpendicular to the direction in which the photodiodes of each line sensor are aligned.

Figure 4:
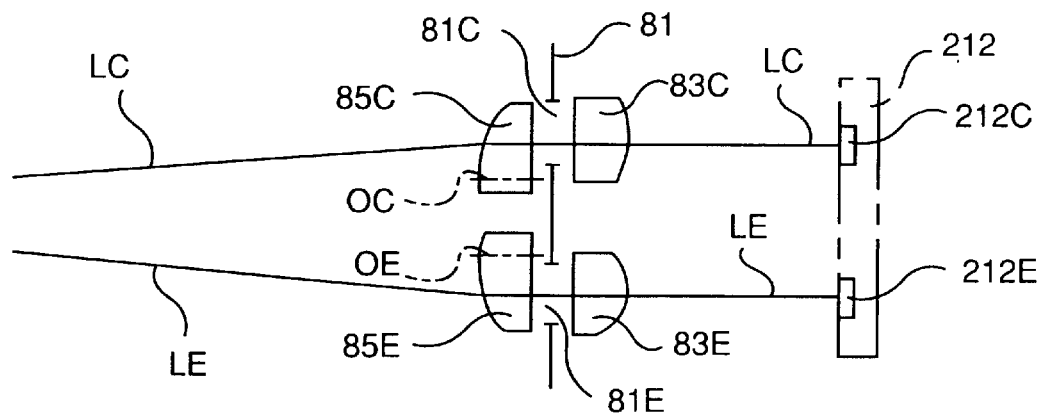
FIG. 4 is a cross sectional view of the first embodiment of separator lenses and peripheral portions thereof in the optical system of the multipoint focus detecting apparatus shown in FIG. 1, as viewed in the direction of the arrow A shown in FIG. 1.
Figure 5:
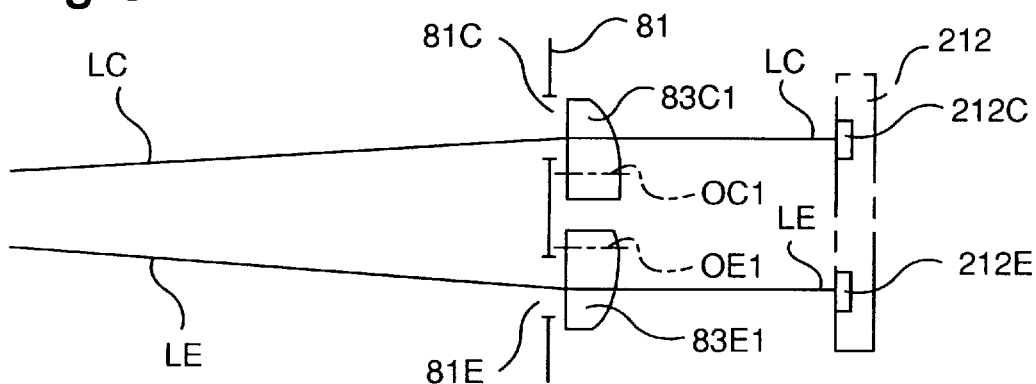
FIG. 5 is a cross sectional view of the second embodiment of separator lenses and peripheral portions thereof in the optical system of the multipoint focus detecting apparatus shown in FIG. 1, as viewed in the direction of the arrow A shown in FIG. 1.
Figure 6:
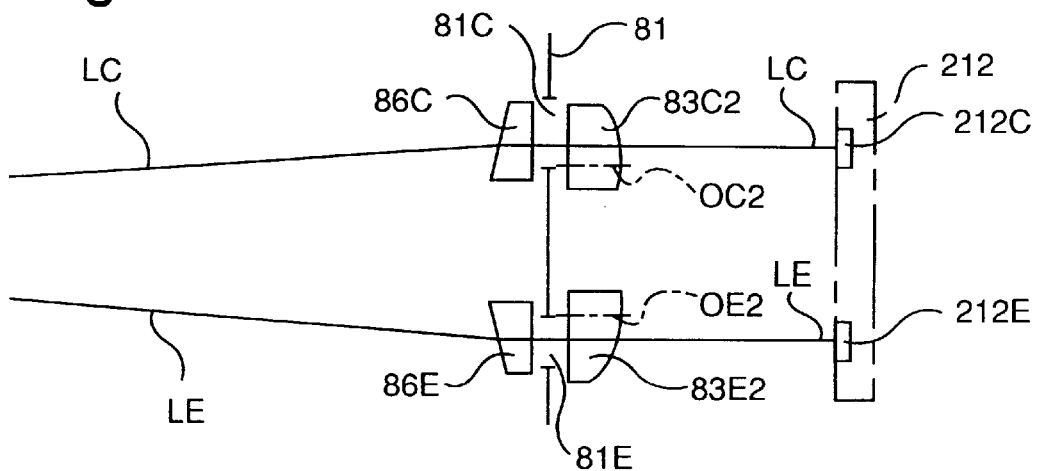
FIG. 6 is a cross sectional view of the third embodiment of separator lenses and peripheral portions thereof in the optical system of the multipoint focus detecting apparatus shown in FIG. 1, as viewed in the direction of the arrow A shown in FIG. 1.

The basic structure of the present embodiment of the multifocus AF sensor unit 21 to which the present invention is applied has been discussed above. The structure of the present embodiment of the multifocus AF sensor unit 21 which aligns the light bundles respectively passed through the pair of separator lenses 83A, 83B, 83C, 83D, 83E or 83F so as to be parallel to each other will be hereinafter discussed with reference to FIGS. 4, 5 and 6. Each of FIGS. 4, 5 and 6 is a cross sectional view of separator lenses and peripheral portions thereof in the optical system of the multifocus AF sensor unit 21, as viewed in the direction of the arrow A shown in FIG. 1. Only the structure of the portion of the optical system associated with the left light bundle LC and the leftmost light bundle LE will be discussed with reference to FIGS. 4, 5 and 6 since the structure of corresponding portion of the optical systems associated with the central light bundle LA, the upper-central light bundle LB, the right light bundle LD and the rightmost light bundle LF, have the same structure.

FIG. 4 shows the first embodiment of separator lenses associated with the left light bundle LC and the leftmost light bundle LE. In this embodiment, the multifocus AF sensor unit 21 is provided in front of each opening of the pair of openings 81C with auxiliary lenses 85C, so that the optical axes OC of the auxiliary lenses 85C are respectively decentered from the center axes of the pair of openings 81C. Only one of the two auxiliary lenses 85C is shown in FIG. 4. Likewise, the multifocus AF sensor unit 21 is provided, in front of each opening of the pair of openings 81E, with auxiliary lenses 85E, so that the optical axes OE of the auxiliary lenses 85E are respectively decentered from the center axes of the pair of openings 81E. Only one of the two auxiliary lenses 85E is shown in FIG. 4. The left light bundle LC and the leftmost light bundle LE are made parallel with respect to each other by passing through peripheral portions of each separator lens 85C and peripheral portions of each separator lens 85E, respectively. Subsequently, each of the light bundles LC and LE made parallel to each other passes through the corresponding pair of openings 81C or 81E to be incident on the corresponding pair of separator lenses 83C or 83E. Namely, the two pairs of auxiliary lenses 85C and 85E are positioned relative to the two pairs of openings 81C and 81E with the optical axes of the former two pairs being decentered from the center axes of the latter two pairs in a manner such that the light bundles LC and LE which are passed through the pairs of separator lenses 83C and 83E are incident on the line sensors 212C and 212E, respectively, with the light bundles LC and LE being parallel to one another in a plane (a plane parallel to the page of FIG. 4) perpendicular to the direction in which the photodiodes of each line sensor 212C and 212E are aligned.

Furthermore, each of the line sensors 212C and 212E formed on the light receiving surface are aligned on the same plane, wherein the pairs of separator lenses 83C and 83E are provided so that the light bundles LC and LE are each incident on the respective line sensors 212C and 212E at an angle perpendicular to the light receiving surface.

According to the first embodiment shown in FIG. 4, the line sensors 212C and 212E can be easily positioned in place and also the positions of the line sensors 212C and 212E can be easily adjusted because the light bundles LC and LE are made parallel to each other before entering the pairs of separator lenses 83C and 83E by the decentered pairs of auxiliary lenses 85C and 85E positioned in front of the pairs of openings 81C and 81E, respectively. Furthermore, since the light paths of the light bundles LC and LE between the separator mask 81 and the light receiving surfaces of the line sensors 212C and 212E are respectively shortened by the auxiliary lenses 85C and 85E, the space between the pair of separator lenses 83C and the pair of separator lenses 83E (i.e., the distance between the light bundles LC and LE) can also be shortened, which makes it possible to minimize the size of the multipoint AF sensor unit 21.

FIG. 5 shows the second embodiment of separator lenses associated with the left light bundle LC and the leftmost light bundle LE. In this embodiment, the optical axis of each separator lens is decentered from the center axis of the corresponding opening of the separator mask 81. Accordingly, a pair of separator lenses 83C1 corresponding to the pair of separator lenses 83C shown in FIG. 1 are positioned behind the separator mask 81 so that the optical axis OC1 of each separator lens 83C1 is decentered from the center axis of the corresponding opening 81C of the separator mask 81. Likewise, a pair of separator lenses 83E1 corresponding to the pair of separator lenses 83E shown in FIG. 1 are positioned behind the separator mask 81 so that the optical axis OE1 of each separator lens 83E1 is decentered from the center axis of the corresponding opening 81E of the separator mask 81. Namely, the two pairs of separator lenses 83C1 and 83E1 are positioned relative to the two pairs of openings 81C and 81E with the optical axes OC1 and OE1 of the former two pairs being decentered from the center axes of the latter two pairs in a manner so that the light bundles LC and LE which are passed through the pairs of separator lenses 83C1 and 83E1 are incident on the line sensors 212C and 212E, respectively, with the light bundles LC and LE being parallel to one another in a plane (a plane parallel to the page of FIG. 5) perpendicular to the direction in which the photodiodes of each line sensor 212C and 212E are aligned.

According to the second embodiment shown in FIG. 5, there is no need for the multifocus AF sensor unit 21 to be provided with any additional optical member because the light bundles LC and LE are made parallel to each other by the pairs of decentered separator lenses 83C1 and 83E1.

FIG. 6 shows the third embodiment of separator lenses associated with the left light bundle LC and the leftmost light bundle LE. In this embodiment, the optical axis of each separator lens is decentered from the center axis of the corresponding opening of the separator mask 81, similar to the second embodiment shown in FIG. 5. A pair of separator lenses 83C2 corresponding to the pair of separator lenses 83C shown in FIG. 1 are positioned behind the separator mask 81 so that the optical axis OC2 of each separator lens 83C2 is decentered from the center axis of the corresponding opening 81C of the separator mask 81. Likewise, a pair of separator lenses 83E2 corresponding to the pair of separator lenses 83E shown in FIG. 1 are positioned behind the separator mask 81 so that the optical axis OE2 of each separator lens 83E2 is decentered from the center axis of the corresponding opening 81E of the separator mask 81. Furthermore, the multifocus AF sensor unit 21 is provided in front of the pair of openings 81C with a prism (light bundle deflector) 86C, while the multifocus AF sensor unit 21 is further provided in front of the pair of openings 81E with a prism (light bundle deflector) 86E. The prisms 86C and 86E respectively bend the light bundles LC and LE in directions to reduce the angle of divergence between the light bundles LC and LE which are respectively passed through the prisms 86C and 86E. The light bundle LC deflected by the prism 86C passes through the pair of openings 81C to be incident on the pair of decentered separator lenses 83C2, while the light bundle LE deflected by the prism 86E passes through the pair of openings 81E to be incident on the pair of decentered separator lenses 83E2. The light bundles LC and LE which are passed through the pairs of separator lenses 83C2 and 83E2 are incident on the line sensors 212C and 212E, respectively, with the light bundles LC and LE being parallel to one another in a plane (a plane parallel to the page of FIG. 6) perpendicular to the direction in which the photodiodes of each line sensor 212C and 212E are aligned. Namely, the two prisms 86C and 86E and the two pairs of separator lenses 83C2 and 83E2 are arranged so that the light bundles LC and LE which are passed through the pairs of separator lenses 83C2 and 83E2 are incident on the line sensors 212C and 212E, respectively, with the light bundles LC and LE being parallel to one another in a plane perpendicular to the direction in which the photodiodes of each line sensor 212C and 212E are aligned.

According to the third embodiment shown in FIG. 6, since the light bundles LC and LE are made parallel to each other by the pairs of decentered separator lenses 83C2 and 83E2 and the prisms 86C and 86E respectively positioned in front of the pairs of openings 81C and 81E, the amount of decentering of each pair of separator lenses 83C2 and 83E2 is smaller compared with that of the second embodiment shown in FIG. 5, reducing undesirable influence (e.g, aberration) on the optical system of the multifocus AF sensor unit 21.

The structure of each of the first, second and third embodiments shown in FIGS. 4, 5 and 6, respectively, is applicable to the structure of the corresponding portion of the optical system associated with the central light bundle LA and the upper-central light bundle LB and also the structure of corresponding part of the optical system associated with the right light bundle LD and the rightmost light bundle LF. In the case where the structure of any one of the first, second and third embodiments is applied to the optical system associated with the light bundles LA, LB, LC, LD, LE and LF, all the light bundles LA, LB, LC, LD, LE and LF which are passed through the pairs of separator lenses 83A through 83F to proceed towards the line sensors 212A through 212F, respectively, become parallel to one another in a plane perpendicular to the direction in which the photodiodes of each line sensor 212C and 212E are aligned. In this case, since all the light bundles LA, LB, LC, LD, LE and LF which are respectively incident on the line sensors 212A through 212F are parallel to one another, the positions of the line sensors 212A through 212F can be adjusted as a whole even though the three line sensors 212A, 212E and 212F are arranged at regular intervals along a lower line while the remaining three line sensors (212B, 212C and 212D) are arranged at the same regular intervals along an upper line positioned above and parallel to the lower line. Therefore, the six line sensors 212A through 212F can be easily fixed on a common circuit board. Furthermore, the respective spaces among the principal rays of the light bundles LA, LB, LC, LD, LE and LF do not vary even if the circuit board on which the line sensors 212A through 212F are fixed is moved forwardly or rearwardly to adjust the position of the circuit board. This makes it easy to perform a line-sensor centering operation in which the line sensors 212A through 212F is moved in a plane in which the circuit board on which the line sensors 212A through 212F are fixed lies; and also a line-sensor-axial-position adjusting operation in which the circuit board on which the line sensors 212A through 212F are fixed is moved forwardly or rearwardly.

In the illustrated embodiments, although five peripheral focus detection zones (i.e., the upper-central focus detection zone 70B, the left focus detection zone 70C, the leftmost focus detection zone 70E, the right focus detection zone 70E and the rightmost focus detection zone 70F) are arranged around the central focus detection zone 70A; this arrangement, shape and size, is not limited solely thereto. The present invention can be applied to any multipoint focus detecting apparatus having a plurality of focus detection zones.

As can be understood from the foregoing, according to the multipoint focus detecting apparatus to which the present invention is applied, since the principal rays of the light bundles which are respectively passed through a plurality of focus detecting zones to be incident on the plurality of arrays of light receiving elements extend parallel to one other in a plane perpendicular to the direction in which the light receiving elements of each line sensor are aligned, each light bundle can be precisely led to the corresponding array of light receiving elements while adjusting operations such as the aforementioned line-sensor centering operation and the line-sensor-axial-position adjusting operation can be easily performed.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A multipoint focus detecting apparatus having a plurality of focus detecting zones arranged in a first pattern on a predetermined focal plane, and a corresponding plurality of arrays of light receiving elements which are arranged in a second pattern that is different from said first pattern, wherein a corresponding plurality of light bundles which are passed through said plurality of focus detecting zones are made incident on said plurality of arrays of light receiving elements, respectively; said multipoint focus detecting apparatus comprising:

a plurality of pairs of separator lenses, each pair of which divides an image in a corresponding one of said plurality of focus detecting zones into two separate images on a corresponding one of said plurality of arrays of light receiving elements;

a separator mask positioned in front of said plurality of pairs of separator lenses and comprising a plurality of pairs of openings to correspond to said plurality of pairs of separator lenses, each opening of said plurality of pairs of openings determining the size of a bundle of rays which enters a corresponding one separator lens of said plurality of pairs of separator lenses; and a light bundle deflector positioned in the close vicinity of said plurality of pairs of separator lenses;

wherein a first array of said plurality of arrays of light receiving elements, on which a first light bundle which is passed through a first focus detecting zone of said plurality of focus detecting zones is incident, and a second array of said plurality of arrays of light receiving elements, on which a second light bundle which is passed through a second focus detecting zone of said plurality of focus detecting zones is incident, are aligned so as to be parallel to each other and apart from each other by a predetermined distance in a direction perpendicular to a direction in which light receiving elements of each of said plurality of arrays of light receiving elements are aligned; and wherein said light bundle deflector is positioned in the vicinity of said plurality of pairs of separator lenses so that a principal ray of said first light bundle and a principal ray of said second light bundle extend parallel to each other in a plane perpendicular to said direction in which said light receiving elements are aligned.

2. The multipoint focus detecting apparatus according to claim 1, wherein said light bundle deflector comprises a plurality of auxiliary lenses each of which is positioned in front of a corresponding opening of said plurality of pairs of openings so that the optical axis of each said auxiliary lens is decentered from a center axis of said corresponding opening.

3. The multipoint focus detecting apparatus according to claim 1, wherein said light bundle deflector comprises a plurality of prisms positioned in front of said plurality of pairs of openings, respectively.

4. The multipoint focus detecting apparatus according to claim 3, wherein each separator lens of said plurality of pairs of separator lenses is decentered from a center axis of a corresponding opening of said plurality of pairs of openings.

5. The multipoint focus detecting apparatus according to claim 1, wherein said first focus detecting zone and said second focus detecting zone are positioned on said predetermined focal plane away from the center of said predetermined focal plane on the same side relative to said center of said predetermined focal plane;

wherein said second focus detecting zone is positioned farther away from said center of said predetermined focal plane than said first focus detecting zone.

6. The multipoint focus detecting apparatus according to claim 1, wherein said first focus detecting zone is positioned on said predetermined focal plane at substantially the center thereof, and wherein said second focus detecting zone is positioned away from said center of said predetermined focal plane.

7. A multipoint focus detecting apparatus having a plurality of focus detecting zones arranged in a first pattern on a predetermined focal plane, and a corresponding plurality of arrays of light receiving elements which are arranged in a second pattern that is different from said first pattern, wherein a corresponding plurality of light bundles which are passed through said plurality of focus detecting zones are made incident on said plurality of arrays of light receiving elements, respectively; said multipoint focus detecting apparatus comprising:

a plurality of pairs of separator lenses, each pair of which divides a light bundle of an image observed through a corresponding one of said plurality of focus detecting zones into two light bundles, so that said light bundle is formed as two separate images on a corresponding one of said plurality of arrays of light receiving elements; and a separator mask positioned in front of said plurality of pairs of separator lenses and comprising a plurality of pairs of openings to correspond to said plurality of pairs of separator lenses, each opening of said plurality of pairs of openings determining the size of a bundle of rays which enters a corresponding one separator lens of said plurality of pairs of separator lenses; and wherein a first array of said plurality of arrays of light receiving elements, on which a first light bundle which is passed through a first focus detecting zone of said plurality of focus detecting zones is incident, and a second array of said plurality of arrays of light receiving elements, on which a second light bundle which is passed through a second focus detecting zone of said plurality of focus detecting zones is incident, are positioned parallel to each other and apart from each other by a predetermined distance in a direction perpendicular to a direction in which light receiving elements of each of said plurality of arrays of light receiving elements are aligned; and wherein each separator lens of said plurality of pairs of separator lenses is decentered from a center axis of a corresponding opening of said plurality of pairs of openings so that a principal ray of said first light bundle and a principal ray of said second light bundle extend parallel to each other in a plane perpendicular to said direction in which said light receiving elements are aligned.

8. The multipoint focus detecting apparatus according to claim 7, wherein said first focus detecting zone and said second focus detecting zone are positioned on said predetermined focal plane away from the center of said predetermined focal plane on the same side relative to said center of said predetermined focal plane;

wherein said second focus detecting zone is positioned farther away from said center of said predetermined focal plane than said first focus detecting zone.

9. The multipoint focus detecting apparatus according to claim 7, wherein said first focus detecting zone is positioned on said predetermined focal plane at substantially the center thereof, and wherein said second focus detecting zone is positioned away from said center of said predetermined focal plane.

10. The multipoint focus detecting apparatus according to claim 1, wherein each light receiving element of said plurality of arrays of light receiving elements comprises a photodiode.

11. The multipoint focus detecting apparatus according to claim 7, wherein each light receiving element of said plurality of arrays of light receiving elements comprises a photodiode.

12. The multipoint focus detecting apparatus according to claim 1; wherein said multipoint focus detecting apparatus is incorporated in an SLR camera.

13. The multipoint focus detecting apparatus according to claim 7; wherein said multipoint focus detecting apparatus is incorporated in an SLR camera.

* * * * *